(12) United States Patent
Yan

(10) Patent No.: US 10,291,583 B2
(45) Date of Patent: *May 14, 2019

(54) VEHICLE COMMUNICATION SYSTEM BASED ON CONTROLLER-AREA NETWORK BUS FIREWALL

(71) Applicant: VisualThreat Inc., San Jose, CA (US)

(72) Inventor: Wei Yan, San Jose, CA (US)

(73) Assignee: VISUALTHREAT INC., San Jose, CA (US)

(*) Notice: Subject to any disclaimer, the term of this patent is extended or adjusted under 35 U.S.C. 154(b) by 4 days.

This patent is subject to a terminal disclaimer.

(21) Appl. No.: 15/486,081

(22) Filed: Apr. 12, 2017

(65) Prior Publication Data

US 2017/0302626 A1    Oct. 19, 2017

Related U.S. Application Data

(60) Provisional application No. 62/321,999, filed on Apr. 13, 2016.

(51) Int. Cl.
*H04L 29/06* (2006.01)
*H04L 12/403* (2006.01)
*H04L 29/08* (2006.01)

(52) U.S. Cl.
CPC ........ *H04L 63/0227* (2013.01); *H04L 12/403* (2013.01); *H04L 63/101* (2013.01); *H04L 67/12* (2013.01)

(58) Field of Classification Search
CPC ............. G06F 21/554; G06F 2221/034; H04L 63/101; H04L 63/1416; H04L 63/1425; H04L 63/0227; H04L 12/403; H04L 67/12; H04W 12/08; H04W 12/12; H04W 4/046

See application file for complete search history.

(56) References Cited

U.S. PATENT DOCUMENTS

| 8,694,328 | B1* | 4/2014 | Gormley | G06Q 30/0621 705/1.1 |
| 8,848,608 | B1* | 9/2014 | Addepalli | H04W 4/046 370/328 |
| 9,734,528 | B2* | 8/2017 | Gormley | G06Q 30/0621 |
| 2005/0171660 | A1* | 8/2005 | Woolford | G06F 1/3203 701/29.3 |

(Continued)

*Primary Examiner* — Ghodrat Jamshidi
(74) *Attorney, Agent, or Firm* — Morgan, Lewis & Bockius LLP

(57) ABSTRACT

A vehicle communication system boarded on a vehicle, comprises a main processor, a Controller Area Network (CAN) controller, and a bi-directional firewall module. The main processor is configured to send one or more CAN messages to the CAN controller and the CAN controller is configured to forward the CAN messages to a CAN through the bi-directional firewall module. The bi-directional firewall module further includes a vehicle status logger, a CAN message filter and a storage module, and the vehicle status logger is configured to check the vehicle's status by collecting diagnostic parameters from ECUs, the storage module is configured to store a white-list and a black-list, and the CAN message filter is configured to selectively choose one of the white-list and the black-list according to different statuses of the vehicle and apply the one of the white-list and the black-list to the CAN messages.

7 Claims, 3 Drawing Sheets

(56) References Cited

U.S. PATENT DOCUMENTS

| | | | |
|---|---|---|---|
| 2009/0132110 A1* | 5/2009 | Fink | G01R 31/007 701/31.4 |
| 2011/0225096 A1* | 9/2011 | Cho | G06Q 10/20 705/305 |
| 2011/0227709 A1* | 9/2011 | Story | B60R 25/102 340/10.42 |
| 2012/0046807 A1* | 2/2012 | Ruther | B60R 25/24 701/2 |
| 2014/0259143 A1* | 9/2014 | Kuhnl | G08C 25/00 726/11 |
| 2015/0195297 A1* | 7/2015 | Ben Noon | B60R 16/023 726/22 |
| 2015/0210288 A1* | 7/2015 | Luong | H04L 51/046 701/49 |

* cited by examiner

VEHICLE COMMUNICATION SYSTEM BASED ON CONTROLLER-AREA NETWORK BUS FIREWALL

RELATED APPLICATION

This application claims priority to U.S. Provisional Patent Application No. 62/321,999, entitled "VEHICLE COMMUNICATION SYSTEM BASED ON CONTROLLER-AREA NETWORK BUS FIREWALL," filed Apr. 13, 2016, which is incorporated by reference in its entirety.

TECHNICAL FIELD

The present application relates to a technical field of vehicle communication system, and especially to a vehicle communication system based on Controller-Area Network CAN-bus firewall.

BACKGROUND

Vehicle infotainment communication module is divided into Infotainment System (IS) and Telematics Control Unit (TCU) or Telematics Box (TBOX). Each of these modules typically includes a main processor and a Controller Area Network (CAN) controller. The main processor receives CAN messages from the cloud via a communication module and forwards them to the CAN controller. The CAN controller is connected to a CAN bus and is able to send the CAN messages to the CAN bus to control the vehicle.

Without a firewall, the CAN controller can only send CAN messages passively to the CAN bus without distinguishing whether the CAN messages are benign sent by the vehicle users or malicious sent by hackers.

Therefore, it is desirable to develop a vehicle communication system based on CAN-bus firewall to effectively resolve the above technical problem.

SUMMARY

In order to achieve the above purpose, a vehicle communication system based on CAN-bus firewall is provided, which includes: a main processor, a CAN controller, and a bi-directional firewall module; wherein, the main processor is configured to send one or more CAN messages to the CAN controller and the CAN controller is configured to forward the CAN messages to the CAN bus. The CAN controller is connected to the CAN bus through the bi-directional firewall module. Therefore, the vehicle communication system is connected to the CAN bus through the bi-directional firewall module.

In some embodiments, the bi-directional firewall module includes a vehicle status logger, a CAN message filter and a storage module; wherein, the vehicle status logger is configured to check the vehicle status by checking the diagnostic parameters sending from various ECUs (Electrical Control Unit) into the CAN bus; the storage module is configured to store the pre-defined white-list and/or black-list of CAN message IDs and the logs of the firewall alert event; the CAN message filter is configured to selectively choose different white-list or black-list of CAN message IDs according to the vehicle status.

The blocked CAN messages and the generated firewall event logs are periodically uploaded to the cloud server for alert event correlation.

In some embodiments, the vehicle communication system may include one or more of these following modules, the wireless-communication module, the audio-output module and the GPS module.

In some embodiments, the communication module may include one or more of a 2G module, a 3G module, a 4G module, the Bluetooth module and the Wi-Fi module.

Correspondingly, a method for controlling a vehicle communication system based on CAN-bus firewall, includes:

Step S1: a bi-directional diagnostic firewall module receives one or more CAN messages from a CAN controller.

Step S2: within the bi-directional firewall module, a vehicle status logger checks the vehicle status by checking diagnostic parameters sending from various ECUs into CAN bus and a CAN message filter chooses a corresponding white-list or black-list of CAN message IDs according to different vehicle status and apply to the received CAN messages.

Step S3: if the received CAN messages are from the white-list, they will be passed to the CAN-bus. Otherwise, the CAN messages are blocked and a firewall event generated.

Step S4: the CAN bus executes vehicle operations corresponding to the passed CAN messages.

In some embodiments, the control method further includes: periodically uploading the blocked CAN messages and the generated alert events to the cloud server for further analysis.

In some embodiments, the vehicle status includes: off, idle and driving; each status having its corresponding white-list and/or black-list.

In some embodiments, the bi-directional firewall module updates the white-list and/or the black-list of CAN message IDs. The cloud server calculates the incremental delta $\Delta$ from the old version F1 of the white-list and/or the black-list, then sends the delta $\Delta$ to the bi-directional firewall module, which then downloads the updates through wireless network.

Upon receiving the update delta, the bi-directional firewall module merges the increment delta $\Delta$ with the old version F1 of the white-list and/or the black-list to generate the new version F2.

In the present disclosure, based on the bi-directional firewall module, the vehicle communication system can determine if the incoming CAN message is malicious or not, and then block the malicious ones and alert vehicle users. The vehicle communication system periodically uploads the blocked CAN message and the generated logs of firewall events to the cloud server for event correlation.

DETAILED DESCRIPTION

The following content combines the detailed explanation of the figures and the embodiments to effectively describe the present application.

Figure 1:
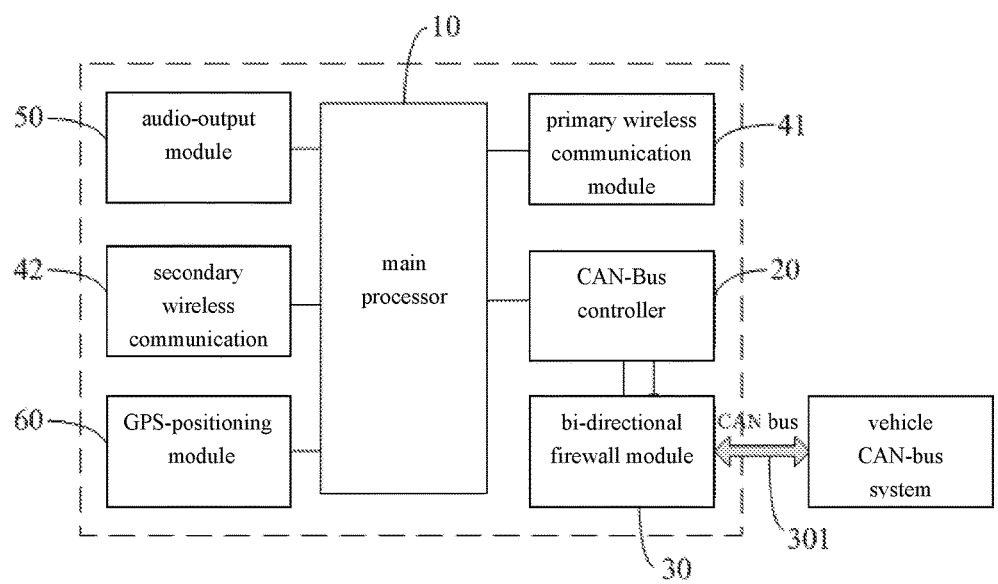
FIG. 1 is a schematic view, showing a vehicle communication system including a bi-directional firewall module.

FIG. 1 shows a vehicle communication system based on CAN-bus firewall. The vehicle communication system includes: a main processor 10, a CAN controller 20 and a bi-directional firewall module 30; wherein, the main processor 10 is configured to send CAN messages to control the vehicle; the CAN controller 20 is connected to the main processor 10, the CAN controller 20 is connected to the CAN bus 301 through the bi-directional firewall module 30. Therefore, the vehicle communication system connects to the CAN bus 301 through the bi-directional firewall module 30.

Figure 2:
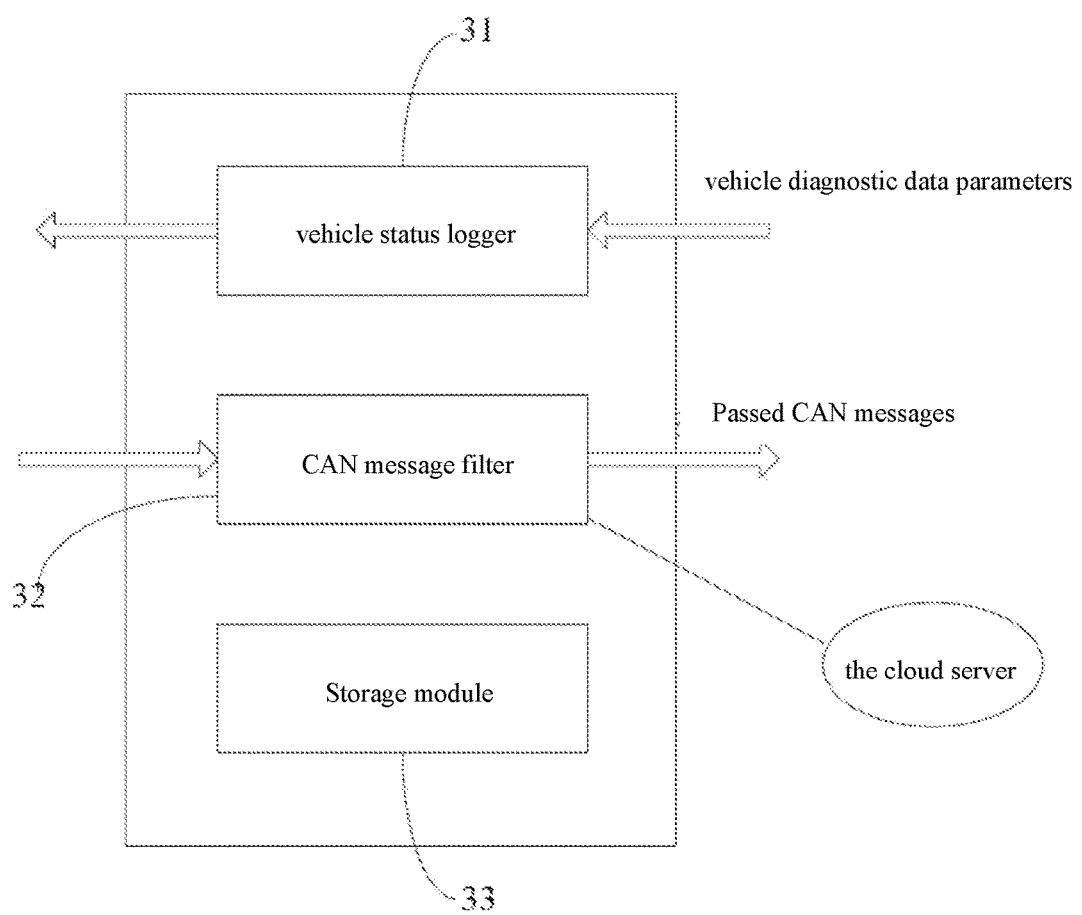
FIG. 2 is a schematic view, showing the module of the bi-directional firewall module according to an embodiment of the present disclosure.

In FIG. 2, the bi-directional firewall module 30 of the present application includes: a vehicle status logger 31, a CAN message filter 32 and a storage module 33; wherein, the vehicle status logger 31 is used to check vehicle status by checking diagnostic parameters sending from ECUs into the CAN bus; the storage module 33 is used to store data of the white-list and the black-list; the CAN message filter 32 is used to choose different white-list or black-list according to vehicle status in order to determine whether to pass the CAN message into the vehicle CAN-bus system or not. Furthermore, the vehicle status logger 31 is also configured to generate firewall event log and store the blocked CAN message and the generated firewall event log in the storage module 33 to periodically upload them to the cloud server for analysis of event correlation.

In the present disclosure, the bi-directional firewall module 30, disposed in the vehicle communication system, includes different white-lists or black-lists of CAN message IDs. The vehicle status includes idle, engine off and driving, wherein each status has its corresponding white-list and/or black-list.

Optionally, the vehicle communication system includes a wireless-communication module, the audio-output module 50, the GPS module 60 and other function modules integrated inside the vehicle communication system. The wireless-communication module includes a primary wireless-communication module 41 and a secondary wireless-communication module 42, wherein the primary wireless-communication module 41 consists of the 2G module, the 3G module, the 4G module, etc., and the secondary wireless-communication module 42 consists of the Bluetooth module, the Wi-Fi module, etc. The bi-directional firewall module is able to support all the above-mentioned communication modes: the 2G/3G/4G mode, the Bluetooth mode, the Wi-Fi mode, etc.

Figure 3:
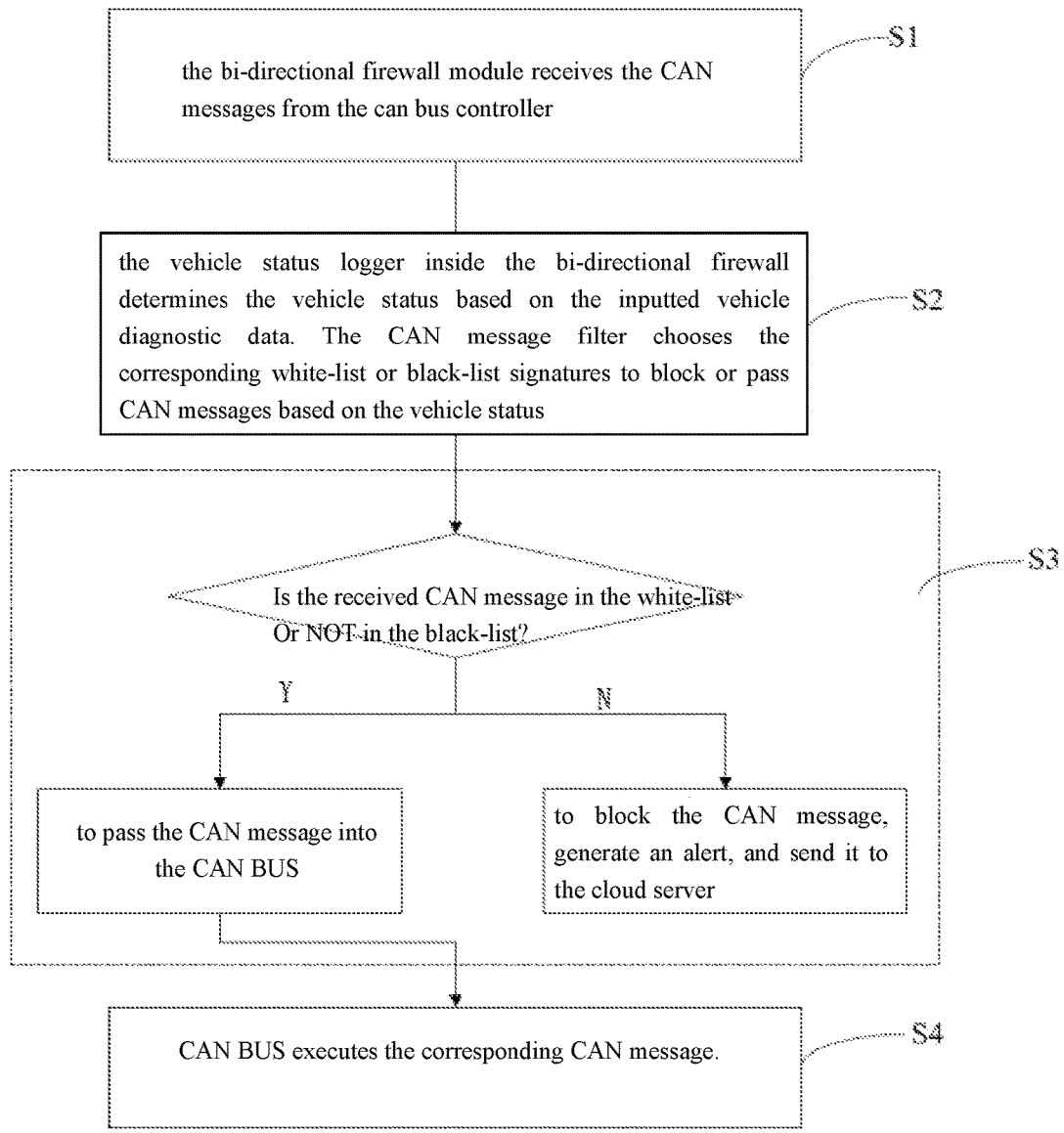
FIG. 3 is a schematic view, showing a CAN message processing flow chart, performed by the vehicle communication system according to an embodiment of the present disclosure.

Correspondingly, FIG. 3 shows how the CAN message is processed inside the vehicle communication system based on CAN-bus firewall. The control method specifically includes:

Step S1: through the wireless-communication module and the main processor, the bi-directional firewall module receives the CAN message sent by the CAN controller.

Step S2: in the bi-directional firewall module, the vehicle status logger checks the vehicle status by checking diagnostic parameters from ECUs into the CAN bus. The CAN message filter chooses corresponding white-list or black-list of CAN message IDs according to different vehicle status.

Step S3: if the CAN message is from the white-list, it is passed to the CAN-bus system. Otherwise, the CAN message is blocked in real-time. A firewall alarm alert is generated. The blocked CAN message and the generated firewall event therefore is periodically uploaded to the cloud server for analysis of event correlation.

Step S4: the CAN bus executes a vehicle operation corresponding to the CAN message passed by the bi-directional firewall module.

In the present disclosure, the vehicle communication system includes a CAN controller 20 that is configured to send the CAN message (action request) to the bi-directional firewall connected to the CAN bus. Upon receiving a CAN message, the bi-directional firewall module checks the vehicle status, chooses a corresponding white-list or black-list and then transmits the received CAN message to the CAN-bus system.

The vehicle status includes idle, engine-off and driving. The vehicle status logger 31 can determine the vehicle status. Furthermore, the vehicle status logger 31 can collect ECU diagnostic parameters at periodical interval, and determine the vehicle status according to the collected parameters.

Each vehicle status has its corresponding white-list or black-list of CAN message IDs. The bi-directional firewall module 30 stores the vehicle records in the storage module 33 and chooses different white-list or black-list according to vehicle status to finally determine whether to pass the CAN message or not. If the CAN message is blocked, an alert will be generated and then stored in the bi-directional module and will also be periodically (e.g., every day) uploaded to the cloud server.

In the present disclosure, the formats of the white-list or the black-list, which are stored in the storage module 33 of the bi-directional firewall module, are respectively as: {CAN ID of the white-list, vehicle status}, {CAN ID of the black-list, vehicle status}.

Optionally, the white-list and/or the black-list of the present embodiment can be remotely updated by downloading update delta through wireless network.

Because a method of incremental update is used in the present embodiment, it is unnecessary to upgrade to an updated version. Technically, the incremental difference delta $\Delta$ will be calculated first by comparing the old version F1 of the white-list and/or black-list with the new version F2. And the cloud server will send the increment A to the bi-directional firewall by downloading updates through wireless network. In other words, the cloud server only updates the increment A. When receiving the increment A, the bi-directional firewall module will merge it with the old version F1 of the white-list and/or black-list in order to generate a new one F2.

In the present disclosure, The IP address of the cloud server will be remotely configured in the bi-directional firewall module so that the received CAN message will be updated to the corresponding white-list or black-list.

From the above technology solutions, the advantages of the prevent invention include:

By disposing a bi-directional firewall module inside the vehicle communication system, the vehicle communication system may be able to determine whether the incoming CAN message is from white-list or not according to different vehicle status, block the abnormal CAN message; and also periodically upload the blocked CAN message and the firewall event log to the cloud server for event correlation.

What is claimed is:

1. A vehicle communication system boarded on a vehicle, comprising:
   a main processor;
   a Controller Area Network (CAN) controller, electrically coupled to the main processor; and
   a bi-directional firewall module, electrically coupled to the CAN controller, wherein:
   the main processor is configured to send one or more CAN messages to the CAN controller and the CAN controller is configured to forward the CAN messages to a CAN through the bi-directional firewall module, wherein the bi-directional firewall module is configured to block one or more of the CAN messages, generate firewall event logs for each blocked CAN message periodically, and upload them to a remote server through the main processor for analysis of event correlation and the bi-directional firewall module further includes a vehicle status logger, a CAN message filter and a storage module, and the vehicle status logger is configured to check the vehicle's status by checking diagnostic parameters from electrical control units (ECUs), the storage module is configured to store a white-list and a black-list of CAN message IDs, and the CAN message filter is configured to selectively choose one of the white-list and the black-list according to different statuses of the vehicle and apply the one of the white-list and the black-list to the CAN messages.

2. The vehicle communication system of claim 1, further comprising: a primary wireless-communication module and a secondary wireless-communication module, wherein the primary wireless-communication module consists of a 2G module, a 3G module, a 4G module, and the secondary wireless-communication module consists of a Bluetooth module, a Wi-Fi module.

3. The vehicle communication system of claim 1, wherein the vehicle status logger is configured to store the blocked CAN message and the generated firewall event logs in the storage module to periodically upload them to the cloud server for analysis of event correlation.

4. The vehicle communication system of claim 1, wherein the bi-directional firewall module is configured to generate an alert for the blocked CAN message and upload the alert to the remote server through the main processor.

5. A method for controlling a vehicle communication system boarded on a vehicle, the vehicle communication system including a main processor, a Controller Area Network (CAN) controller, and a bi-directional firewall module, the method comprising:

receiving, at the bi-directional firewall module, one or more CAN messages from the CAN controller;

checking, at the bi-directional firewall module, the vehicle's status according to vehicle diagnostic parameters; and choosing, at the bi-directional firewall module, a white-list or a black-list according to different statuses of the vehicle and applying the chosen list to each of the CAN messages;

in accordance with a determination that a respective one of the CAN messages is on the white-list, passing the CAN message to a CAN-bus, wherein the CAN bus is configured to execute vehicle operations corresponding to the CAN message; and in accordance with a determination that a respective one of the CAN messages is on the black-list, blocking the CAN message and generating a firewall event log for the blocked CAN message and uploading the firewall event log to a remote server through the main processor for analysis of event correlation.

6. The method of claim 5, wherein the vehicle communication system further comprises: a primary wireless-communication module and a secondary wireless-communication module, wherein the primary wireless-communication module consists of a 2G module, a 3G module, a 4G module, and the secondary wireless-communication module consists of a Bluetooth module, a Wi-Fi module.

7. The method of claim 5, wherein the bi-directional firewall module is configured to generate an alert for the blocked CAN message and upload the alert to the remote server through the main processor.

* * * * *